C. SKIDMORE.
GRADING MACHINE.
APPLICATION FILED SEPT. 25, 1908.

930,320.

Patented Aug. 3, 1909.
2 SHEETS—SHEET 1.

Witnesses
J. L. Wright
D. W. Gould.

Inventor
Charles Skidmore
By Victor J. Evans,
Attorney

C. SKIDMORE.
GRADING MACHINE.
APPLICATION FILED SEPT. 25, 1908.

930,320.

Patented Aug. 3, 1909.
2 SHEETS—SHEET 2.

Witnesses
J. T. L. Wright,
D. W. Gould.

Inventor
Charles Skidmore.
By Victor J. Evans,
Attorney

UNITED STATES PATENT OFFICE.

CHARLES SKIDMORE, OF HOMER, NEBRASKA, ASSIGNOR OF FORTY-NINE ONE-HUNDREDTHS TO JOHN EVANS RUMSEY, OF THURSTON COUNTY, NEBRASKA.

GRADING-MACHINE.

No. 930,320.              Specification of Letters Patent.            Patented Aug. 3, 1909.

Application filed September 25, 1908. Serial No. 454,725.

*To all whom it may concern:*

Be it known that I, CHARLES SKIDMORE, a citizen of the United States, residing at Homer, in the county of Dakota and State of Nebraska, have invented new and useful Improvements in Grading-Machines, of which the following is a specification.

The invention relates to an improvement in grading machines, and is particularly directed to a machine of this type in which the grading operation is effectively performed with the minimum propelling power.

The main object of the present invention is the provision of a grading machine embodying a wheeled frame and carrying a grading or excavating wheel arranged obliquely to the surface over which it is traveling and adapted to pick up the material on the line of excavation and elevate and discharge it at a point remote from such line, the mechanism including means whereby the cutting depth of the excavating wheel may be conveniently controlled at the will of the operator.

The invention will be described in the following specification, reference being had particularly to the accompanying drawings, in which:—

Figure 1:
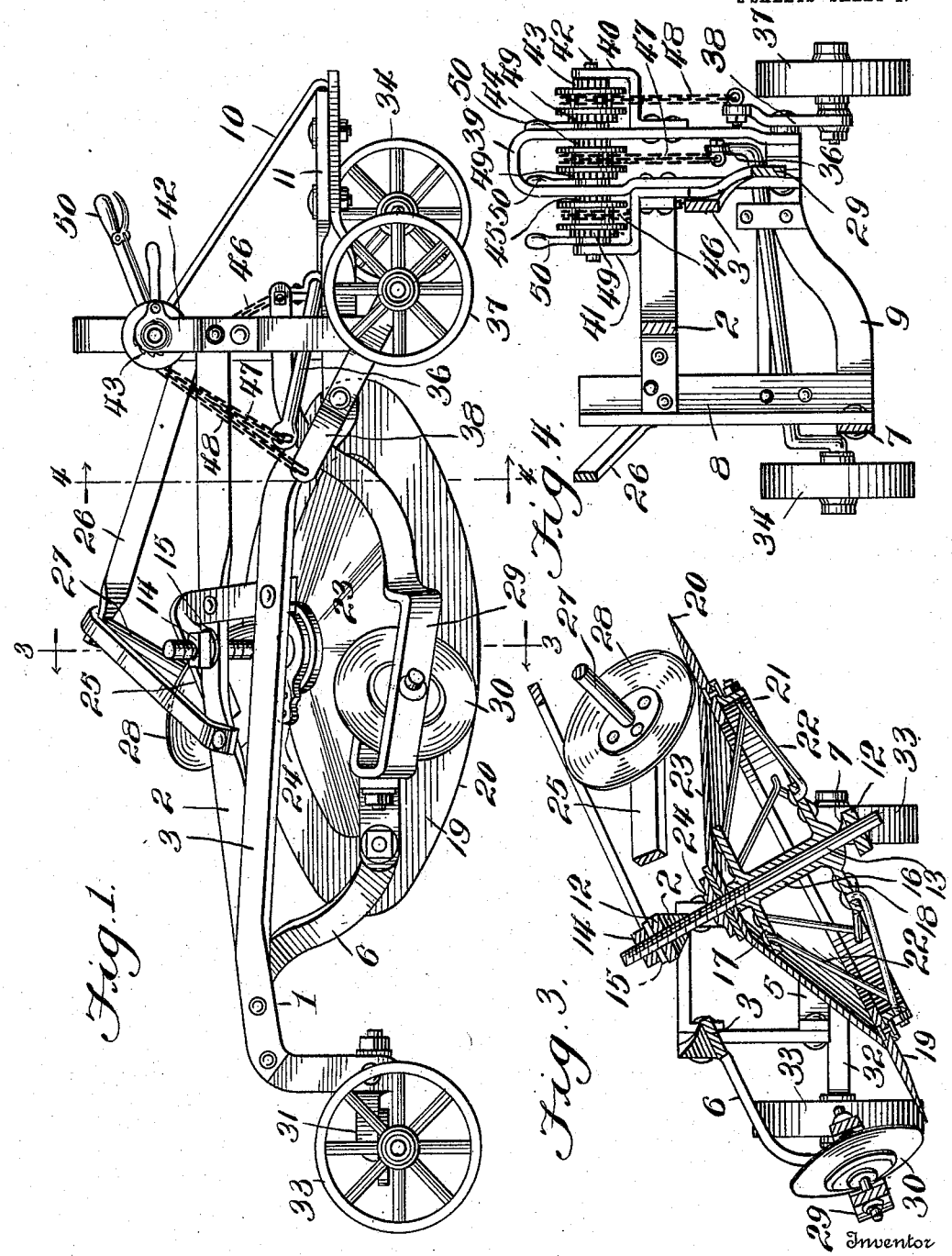
Figure 2:
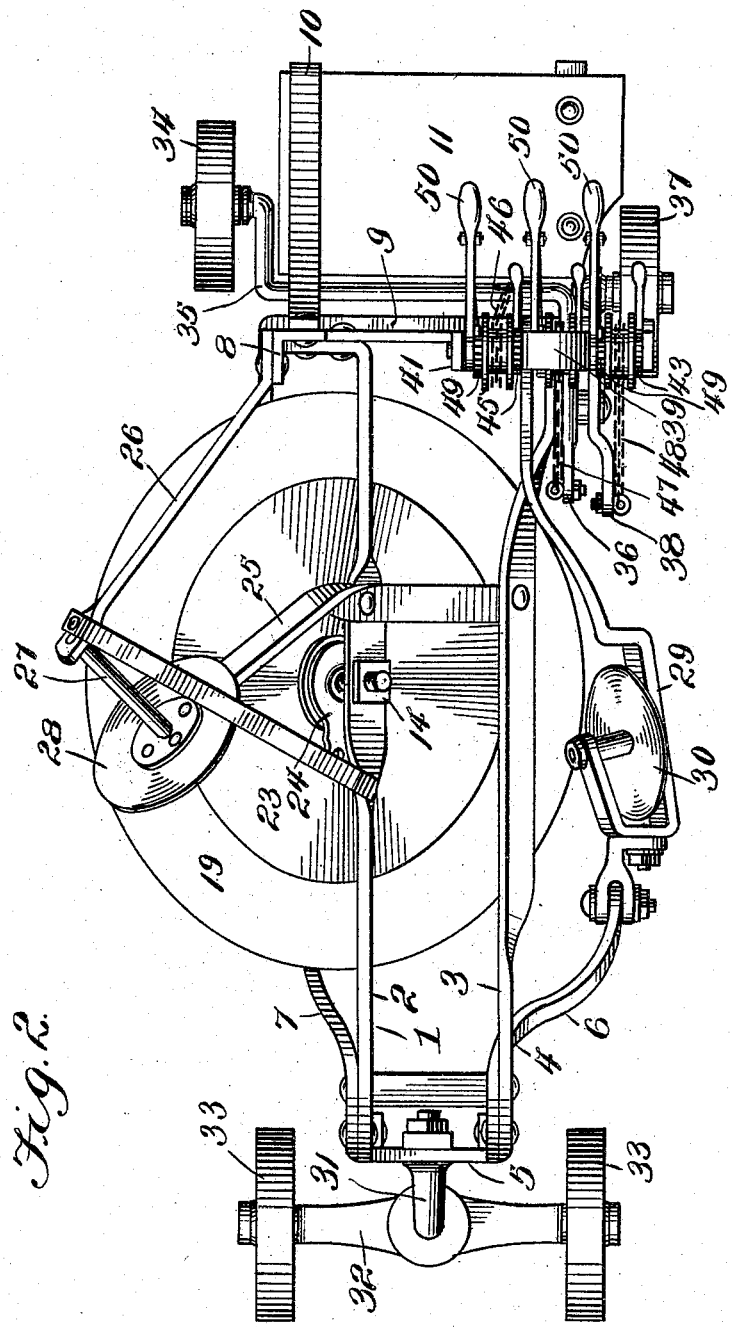

Figure 1 is a perspective view of my improved grading machine. Fig. 2 is a plan of the same. Fig. 3 is a section on line 3—3 of Fig. 1. Fig. 4 is a section on line 4—4 of Fig. 1.

Referring particularly to the accompanying drawings, wherein is illustrated the preferred form of details of the present invention, my improved grader comprises a main frame 1 including spaced parallel bars 2 and 3 extending longitudinally of the machine. The forward ends of the bars 2 and 3 are connected to an auxiliary frame 4, preferably comprising a single length of substantial bar material bent into U-form to provide a forward cross bar 5. The auxiliary frame is connected to the main frame so that the cross bar 5 is arranged below and approximately in vertical alinement with the forward ends of the bars 2 and 3, the side bars of the auxiliary frame extending upwardly from the cross bar to the ends of the bars 2 and 3 and being then extended rearwardly for a short distance in contact with said bars 2 and 3, bolts or rivets serving to secure the auxiliary and main frame together at such points of contact. Beyond the points of connection the side bars 6 and 7 of the auxiliary frame are deflected from the plane of the bars 2 and 3, the side bar 6 extending downwardly and outwardly relative to the bar 3, while the side bar 7 extends downwardly and outwardly relative to the bar 2. The bar 6 terminates some distance in advance of the central point of the bar 3, while the bar 7 extends throughout the length of the main frame and at the rear end thereof is connected to the lower end of a standard 8, being, in rear of the standard, projected laterally transverse the plane of the main frame, as at 9, and connected to the rear end of the bar 3. The bar 3 inclines downwardly and rearwardly from its connection with the auxiliary frame and at the rear end is bent sharply downward and laterally to provide for its connection with the bar 7, as previously described. The rear end of the bar 2 is connected to the upper end of the standard 8, and to said standard and the transverse portion 9 of the bar 7, there is connected a platform frame 10 comprising suitable metallic strips on which there is supported a platform 11 for convenience of the operator.

The central portions of the bars 2 and 7 are twisted from the normal planes of the bars to provide diagonally disposed parallel bearing sections 12, in which is mounted a bearing bolt 13 to support the grading wheel, as clearly shown in Fig. 3. The bearing sections 12 of the respective bars are provided with suitable bearing for the reception of the bolt 13, and said bolt is fixed against downward movement through the medium of a nut 14 secured upon the upper end of the bolt and bearing on a washer 15 resting upon the upper surface of the bearing section of the bar 2. As the bars 2 and 7 are arranged in diagonal alinement, it is obvious that the bearing bolt inclines outwardly and downwardly from the vertical when in position.

The grading wheel comprises a sleeve-like member 16 arranged to fit the bearing bolt and having upper and lower lateral flanges 17 and 18. An annular blade member 19 is provided having its outer peripheral edge sharpened to provide a cutting edge, as at 20. The blade adjacent the inner edge is provided with a depending flange 21 from which brace rods 22 extend to the upper and lower flanges 17 and 18 of the sleeve member, whereby the cutting band and sleeve are secured together. A deflecting truncated cone-shaped member 23 is secured to the upper surface of the cutting blade, said member being of shell-like form open at the lower end with the lower edge resting upon the upper surface of the blade beyond the inner edge of said blade. The upper end of the deflecting member is formed with an opening to receive the bearing bolt 13, and lock nuts 24 are arranged to engage the bolt to secure the deflecting member in place.

Supporting arms 25 and 26 project respectively from the main frame and from the standard 8, the former being connected to both bars 2 and 3 and being beyond said bars projected forwardly and downwardly, terminating in advance of the central point of the main frame and above and inwardly beyond the cutting edge of the blade 19. The arm 26 terminates rearwardly beyond and in diagonal relation to the terminal of the arm 25, said arms supporting at their terminals a shaft 27 on which, adjacent the lowermost arm 25, there is fixed a disk 28. The disk 28, hereinafter termed the discharging disk, is so arranged that its edge is in frictional contact with the upper surface of the blade 19, and by virtue of the arrangement of the arms 25 and 26 the disk 28 operates in a plane at an angle to the plane of the blade 19, thus serving to direct the material carried on said blade during the grading operation off the edge of the blade at the highest point of the latter, as will be obvious from Fig. 3 of the drawings.

Pivotally connected to the terminal of the arm 6 is a disk frame 29 in which is mounted a cutting disk 30. The disk 30 operates in a plane oblique to the vertical plane of the machine and has its operative edge disposed immediately adjacent the lowermost portion of the blade 19, so that the disk 30 operates as a vertical cutting blade in conjunction with the approximately horizontal cutting operation of the blade 19. The rear end of the frame 29 is mounted for movement as hereinafter described, whereby to adjust the cutting depth of the disk 30.

The cross bar 5 of the auxiliary frame is provided with a removable forwardly extending bracket arm 31 terminally provided with a depending portion forming a king bolt to engage the forward axle 32 on which is mounted the ground wheels 33, any suitable means being arranged on the axle to provide for the connection thereto of the draft animals. The right hand rear ground wheel 34, or that wheel on the side of the machine carrying the discharging disk 28 is mounted upon a crank axle 35 supported in bearings fixed in the platform frame 10, the inner end of the axle having a forwardly projecting arm 36, as shown in Fig. 2. The left hand ground wheel 37 is mounted upon the lower end of a lever 38, which is pivotally connected to the main frame at the juncture of the bars 3 and 7. Secured to and rising from the main frame at the juncture of the bars 3 and 7 is a supporting loop 39, on each side bar of which there is secured an outwardly extending L-shaped bracket 40—41, the former projecting outwardly from the loop 39, while the latter projects inwardly therefrom relative to the main frame. Mounted in the uprights of the respective brackets and the side bars of the loop is a shaft 42 on which there is independently mounted three drums 43, 44, and 45, the drum 43 being mounted between the bracket 40 and the loop, the drum 44 being mounted between the side bars of the loop and the drum 45 being mounted between the loop and the bracket 41. The rear end of the supporting frame 29, the forwardly projecting arm 36 of the crank axle 35 and the free end of the lever 38 are arranged to aline vertically with the respective drums 45, 44, and 43, and said parts are connected to the respective drums by chains 46, 47, and 48. The drums are each provided with ratchet bands 49, and loosely mounted on the shaft 42, adjacent each drum, is an operating handle 50 having a pawl to engage the teeth of the band, whereby any particular drum may be operated to take up the connected chain, any simple form of pawl and ratchet mechanism being provided to prevent return movement of the drums at will.

It will be obvious that by adjusting the chain 46 on the drum 45 the cutting depth of the disk 30 may be regulated at will, while adjustment of the chain 47 on the drum 44 will turn the crank axle of the rear wheel 34 and thereby elevate or depress the right hand side of the machine with the effect to regulate the angular position of the excavating wheel relative to the surface over which it is traveling. Adjustment of the chain 48 on the drum 43 will elevate or depress the wheel carrying end of the lever 38, and thereby regulate the cutting depth of the excavating wheel.

The operation of the grader will be apparent from the above description taken in connection with the drawing, it being understood that the material cut by the blade 19 and disk 30 will be elevated in the travel of the wheel and scraped therefrom by the disk 28 for discharge.

Having thus described the invention what is claimed as new, is:—

1. A grading machine comprising a main frame, an excavating wheel operating in a plane oblique to the plane of the main frame, and a rotatable discharging disk frictionally engaging the grading wheel at the highest point of the latter.

2. A grading machine comprising a main frame, an excavating wheel operating in a plane oblique to the plane of the main frame, a rotatable discharging disk frictionally engaging the grading wheel at the highest point of the latter, and means for adjusting the main frame to vary the inclination of the excavating wheel with relation to the surface over which it is traveling.

3. A grading machine comprising a main frame, an excavating wheel operating in a plane oblique to the plane of the main frame, a rotatable discharging disk frictionally engaging the grading wheel at the highest point of the latter, and means for adjusting the main frame to vary the cutting depth of the excavating wheel.

4. A grading machine comprising a wheeled frame, an excavating wheel mounted for movement in a plane oblique to the main frame, means for adjusting one of the wheels of the frame to vary the angular relation of the excavating wheel to the surface over which it is traveling, and means for adjusting another wheel of the frame for varying the cutting depth of the excavating wheel.

5. A grading machine comprising a main frame, an excavating wheel operating in a plane oblique to the main frame, a rotatable discharging disk in frictional contact with the wheel and operating adjacent the highest point of the latter, and a cutting disk carried by the main frame and operating adjacent the lowest or cutting point of the wheel.

6. A grading machine comprising a main frame, an excavating wheel operating in a plane oblique to the main frame, a rotatable discharging disk in frictional contact with the wheel and operating adjacent the highest point of the latter, a cutting disk carried by the main frame and operating adjacent the lowest or cutting point of the wheel, and means for adjusting the depth of the cutting disk relative to the excavating wheel.

In testimony whereof I affix my signature in presence of two witnesses.

CHARLES SKIDMORE.

Witnesses:
 AUDREY ALLAWAY,
 NANNIE ALLAWAY.